April 18, 1950 — E. E. PAOLI — 2,504,871

CANAPE DECORATING AND RETAINING STAND

Filed March 2, 1946

INVENTOR
ETTORE E. PAOLI
BY
ATTORNEY

Patented Apr. 18, 1950

2,504,871

UNITED STATES PATENT OFFICE 2,504,871

CANAPÉ DECORATING AND RETAINING STAND

Ettore E. Paoli, New York, N. Y.

Application March 2, 1946, Serial No. 651,655

2 Claims. (Cl. 91—60)

This invention relates to confection and canapé decorating and retaining stands.

An object of this invention is to form a stand for holding and serving confections and/or canapés.

Another object is to form a confection and canapé stand which can be held by one hand and its board rotated by a finger of the hand holding the stand.

A further object is to form a strong, simple canapé stand which can be easily molded or cast.

These and other objects are accomplished by forming the stand of a board and a handle, the board being rotatably held to the handle and provided with a plurality of grips on its under face for motivating the board and holding elements on its upper surface for retaining the confection.

For further comprehension of the invention, and of the objects and advantages thereof, reference will be had to the following description and accompanying drawings, and to the appended claims in which the various novel features of the invention are more particularly set forth.

In the accompanying drawing forming a material part of this disclosure:

Figure 1:
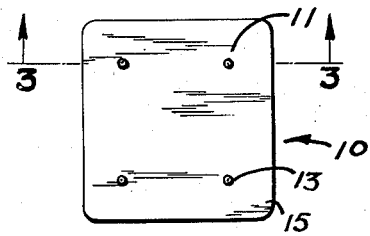
Fig. 1 is a top plan view of a confection decorating stand embodying a form of the invention.
Figure 2:
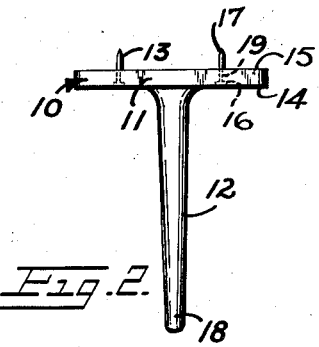
Fig. 2 is a side view of the stand shown in Fig. 1.

In the drawings and in the specification, in which like numbers represent similar elements, a confection decorating and canapé preparing stand 10, shown in Figs. 1 and 2, is comprised of a board 11 and a handle or supporting member 12. The board is provided with a plurality of holding pin elements 13, which extend through the board from its under face 14 to and above its upper face 15. The holding elements, preferably of stainless steel, are provided with enlarged heads 16 flush with the underside of the board 11, and with pointed or sharpened ends 17. The elements are positioned apart so that they can hold a cake or other confection securely while it is being decorated.

The handle or supporting member 12 tapers from board 11 to its lower end 18 and is centrally disposed at the under surface of the board.

The stand 10 as shown and described with the board and tapering handle can be cast as a unit, holes 19 to carry the elements 13, being provided either in the casting process or by subsequent drilling.

Figure 6:
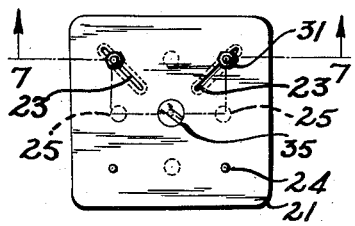
Fig. 6 is a plan view of a further variation in the structure.
Figure 7:
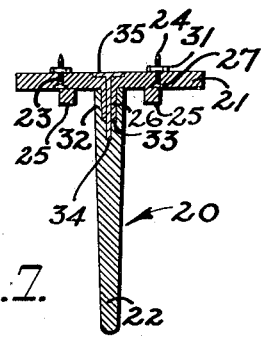
Fig. 7 is a section taken on the line 7—7 of Fig. 6.
Figure 8:
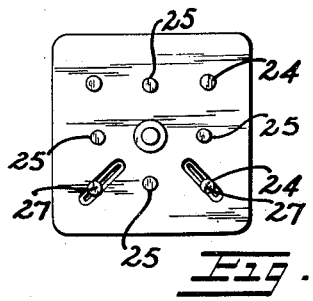
Fig. 8 is a view looking at the under side of the device illustrated in Fig. 7.
Figure 4:
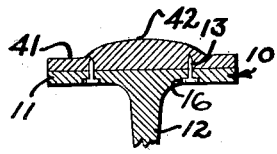
Fig. 4 is a sectional view taken on the line 4—4 of Fig. 3.

In the modification of the invention shown in Figs. 6 to 8, the stand 20 is comprised of a rectangular board 21 and a tapered handle or supporting member 22. The board 21 is provided with two slots 23, four holding elements 24, four finger grips 25 and a centrally located downwardly extending pin 26. The slots 23 extend from two adjacent corners obliquely toward the center of the board. Each of the holding elements 24 is formed with an enlarged head 27, an integral stem 28 extending from the head and terminating in a point 29, the stem being threaded intermediate its ends as at 30. One of the holding elements is slidably positioned in each of the slots and each is provided with a threaded nut or washer 31 above the board and coacting with its threaded part 30. The side of the board opposite the slots is provided with two other holding elements 24, one adjacent each corner.

The four grips 25 are symmetrically positioned on and extend downwardly from the under face of the board, and the stud 26 is centrally positioned on and extends down from the under face of the board.

The handle or supporting member 22 is formed at its larger head end 32 with a co-axial bearing or seat 33. The board rests rotatably on the end 32 of the handle and its stud 26 extends into the bearing or seat 33. A nail or brad 34 with an enlarged head 35 extends through the board and stud 26 and into the end 32 of the handle, rotatably retaining the board and handle together. The construction of the stand 20, as shown and described, permits cakes or other confections of different sizes to be gripped by the holding elements and supported on the board while the confection is rotated by one hand.

The grips 25 are located close to the center of the board so that when the handle is gripped by a hand one of the fingers, usually the index finger, can be extended to reach one of the grips, and by exerting pressure on the grip, rotate the board.

The holding and rotating of the board with one hand permits the other hand to continuously operate a decorating or icing device on a revolving confection.

Figure 5:
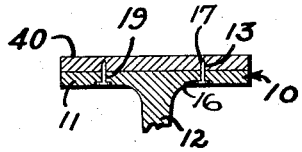
Fig. 5 is a view similar to Fig. 4, but showing a modified form of the device.

In another form of the invention illustrated in Fig. 5, the board 11 is arranged to receive a top piece 40 of rectangular shape and of a size the same as the board 11, said top piece being adapted to cover the sharp ends 17 of the pins 19 so that the board may be used for any purpose such as the shaping of a sticky confection mass that needs no holding means to retain it on the board and where holding pins would be objectionable.

Figure 3:
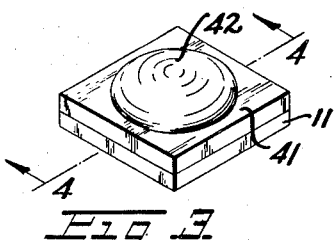
Fig. 3 is a view in perspective of a decorating stand embodying a modification of the invention.

In a further form of the invention shown in Fig. 3 a top piece 41 of the same size as the board 11 is arranged to fit over the pins 19 to cover the piercing ends thereof and is provided with a central domed portion 42 for the purpose of working or shaping the confections while the board is being revolved. The top pieces 40 and 41 may be interchangeably used with the device as shown in Figs. 1 and 2.

The piercing members or pins 23 may be adjusted toward and away from the center of the board to hold confections of different sizes and the adjustment may be made by manipulation of the nuts 31.

While I have illustrated and described the prefered embodiments of my invention, it is to be understood that I do not limit myself to the precise constructions herein disclosed and the right is reserved to all changes and modifications coming within the scope of the invention as defined in the appended claims.

Having thus described my invention, what I claim as new, and desire to secure by United States Letters Patent is:

1. A confection holding stand comprising a flat board, a handle depending from the bottom face of said board, a plurality of confection gripping pins extending upward from the top face of said board, and a flat top piece rested on the top face of said flat board to have a sticky confection which requires no holding rested on the top face thereof, said top piece being formed with holes extended in from the bottom face thereof and into which said pins extend for retaining said top piece against lateral displacement with relation to said flat board, whereby when a non-sticky confection is to be worked said top piece can be lifted off said board so that said non-sticky confection can be rested on said flat board with said pins extending into the non-sticky confection holding the same in position on said flat board.

2. A confection holding stand comprising a flat board, a handle depending from the bottom face of said board, a plurality of confection gripping pins extending upward from the top face of said board, and a flat top piece rested on the top face of said flat board to have a sticky confection which requires no holding rested on the top face thereof, said top piece being formed with holes extended in from the bottom face thereof and into which said pins extend for retaining said top piece against lateral displacement with relation to said flat board, whereby when a non-sticky confection is to be worked said top piece can be lifted off said board so that said non-sticky confection can be rested on said flat board with said pins extending into the non-sticky confection holding the same in position on said flat board, and a central domed portion formed on the top face of said top piece for forming a hollow in the bottom of the sticky confection.

ETTORE E. PAOLI.

REFERENCES CITED

The following references are of record in the file of this patent:

UNITED STATES PATENTS

| Number | Name | Date |
| --- | --- | --- |
| 774,541 | Stephenson | Nov. 8, 1904 |
| 1,711,599 | Harper | May 7, 1929 |
| 1,976,275 | Zell | Oct. 9, 1934 |